(12) United States Patent
Heinzelmann

(10) Patent No.: US 6,659,072 B2
(45) Date of Patent: Dec. 9, 2003

(54) METHOD AND DEVICE FOR MONITORING AN INTERVAL BETWEEN TWO INJECTION OPERATIONS

(75) Inventor: Michael Heinzelmann, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 142 days.

(21) Appl. No.: 10/026,076

(22) Filed: Dec. 21, 2001

(65) Prior Publication Data

US 2002/0096140 A1 Jul. 25, 2002

(30) Foreign Application Priority Data

Dec. 22, 2000 (DE) .......................... 100 64 505

(51) Int. Cl.$^7$ ................................ F02B 3/00
(52) U.S. Cl. ........................ 123/299; 123/305
(58) Field of Search ................. 123/299, 305, 123/294, 300

(56) References Cited

U.S. PATENT DOCUMENTS 5,402,760 A    4/1995    Takeuchi et al.
6,540,149 B1 * 4/2003    Yano et al. ............... 236/92 B

FOREIGN PATENT DOCUMENTS

DE    198 60 393    6/2000

* cited by examiner

*Primary Examiner*—Bibhu Mohanty
(74) *Attorney, Agent, or Firm*—Kenyon & Kenyon

(57) ABSTRACT

A device and a method for monitoring an interval between a first injection operation and a second injection operation of a combustion cycle in a cylinder of an internal combustion engine are described, in which it is determined whether an electrical actuator element has fully opened after the first injection operation and in which it is determined whether energizing sequences of the electrical actuator element overlap. Then, the interval between the first injection operation and the second injection operation is modified as a function of the determination results of the preceding determination operations.

16 Claims, 10 Drawing Sheets

METHOD AND DEVICE FOR MONITORING AN INTERVAL BETWEEN TWO INJECTION OPERATIONS

The present invention relates to a method and a device for monitoring an interval between a first injection operation and a second injection operation of a combustion cycle in a cylinder of an internal combustion engine in which the individual injection operations are controlled by an electrical actuator element.

In known methods and devices for controlling the fuel metering in an injection operation of a combustion cycle in a cylinder of an internal combustion engine, solenoid valves are used for controlling the beginning and the end of the injection.

In today's internal combustion engines, the actual injection is divided into multiple partial injection operations. A pilot injection is preferably carried out in each combustion cycle of a cylinder, in which a small amount is injected, and a main injection operation, in which the main amount of fuel is injected. In a four-stroke internal combustion engine, the combustion cycle includes an intake stroke, a compression stroke, a working stroke, and an exhaust stroke. In addition to a pilot injection operation and a main injection operation, other partial injection operations can be provided. Thus, for example, a post-injection operation can be provided for cleaning the combustion chamber. Furthermore, the pilot injection operation, the main injection operation and/or the post-injection operation can be divided into a plurality of partial injection operations.

German Patent 198 60 393 proposes that the beginning of activation for a subsequent pilot injection for a cylinder be computed on the basis of a desired interval between the pilot injection and the main injection in this cylinder and the beginning of activation of the main injection for a previous injection in a previous cylinder. The interval between the pilot injection and the main injection is defined as a function of at least the rotational speed of the internal combustion engine and the injected amount of fuel.

U.S. Pat. No. 5,402,760 describes a fuel injection controller for an internal combustion engine having a controller which has an interrupting device in order to suppress fuel injection between a pilot injection and a main injection.

These types of multiple injections, the problem arises that the individual injection operations often overlap. This results, for example, in part of the amount of fuel intended for a pilot injection operation being injected into the cylinder during the main injection operation. This is known as injection overlap. Injection overlap and the associated uncontrolled increase in the amount of fuel for an injection operation has a negative effect on the exhaust gases of the engine, the engine torque, and the noise emission in cam-driven systems.

The object of the present invention is to provide a method and a device for monitoring an interval between a first injection operation and a second injection operation of a combustion cycle in a cylinder of an internal combustion engine in which the individual injection operations are controlled by an electrical actuator element.

This objective is achieved by the features presented in claims 1 and 9.

The present invention advantageously makes a well-defined separation of the individual injection operations possible, even in the case of an unforeseen event, such as a sudden drop in the battery voltage.

Advantageous and expedient implementations and refinements of the present invention are presented in the subclaims.

In the following, exemplary embodiments of the present invention are described with reference to the accompanying figures.

Figure 1:
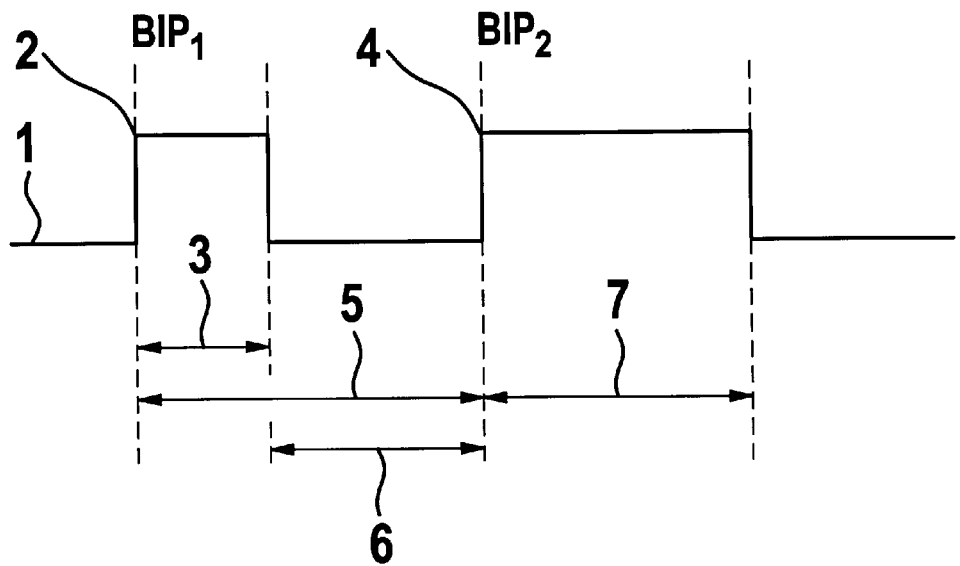
FIG. 1 shows a time sequence chart with an ideal curve of a valve needle position of a solenoid valve during two consecutive injection operations of a combustion cycle in a cylinder.
Figure 2:
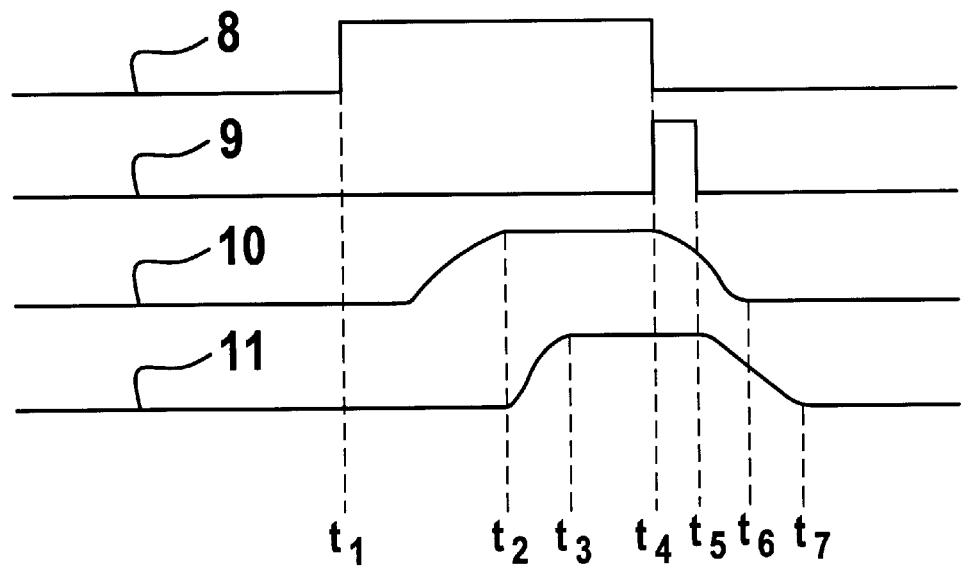
FIG. 2 shows a time sequence chart of an injection operation.

In the following, the processes occurring in principle during a combustion cycle, as illustrated in FIGS. 1 and 2, are described with reference to an injection system having a pressure chamber.

The pressure chamber of such a system has a pump which pressurizes the fuel in the pressure chamber. The pressure chamber also has a first and a second opening. The first opening may be closed using a valve needle of a solenoid valve. The second opening, which will be referred to hereinafter as nozzle opening, is closed using a nozzle needle and connects the pressure chamber to a combustion chamber in a cylinder. When the first opening is closed by actuating the solenoid valve and simultaneously actuating the pump piston by a cam, pressure builds up in the pressure chamber. When the pressure exceeds a predefined nozzle opening pressure, the nozzle needle opens, and fuel is injected into the combustion chamber of the cylinder. When the first opening is reopened, the pressure is able to escape through the first opening. When the pressure drops below a predefined nozzle closing pressure, the nozzle needle closes again, and fuel injection into the combustion chamber of the cylinder is terminated.

FIG. 1 shows a time sequence chart having an ideal curve of the valve needle position of the solenoid valve during two consecutive injection operations of a combustion cycle in a cylinder. In FIG. 1, reference number 1 denotes one position of the valve needle. The valve needle is completely open at a time 2. This time is referred to as $BIP_1$ (beginning of injection period 1) or start of delivery of a first injection operation. In this idealized representation, the time needed for the valve needle to fully open and fully close is disregarded. During the first injection operation, the valve needle remains completely open during a time period 3. This time period is referred to as the first injection period. Delivery for a second injection begins at time 4, which is referred to as BIP$_2$. An interval 5 from the beginning of the delivery for the first injection to the beginning of the delivery for the second injection for the same cylinder is referred to as the injection interval. Furthermore, subtracting injection period 3 for the first injection operation from injection interval 5 yields an injection pause 6, which characterizes the separation of the first injection operation from the second injection operation. An injection period of the second injection operation is labeled 7.

In systems controlled by magnetic valves, such as systems controlled by solenoid valves, PDE systems (pump-nozzle units), PLD systems (pump line nozzle systems), VP systems controlled by solenoid valves (distributor pump systems) or CR systems (common rail systems), as well as in the corresponding systems having piezoelectric actuator elements, the individual injection operations are controlled by electrically activating a solenoid valve or a corresponding piezoelectric actuator element. For the sake of simplicity of the representation, the present invention is described in the following with reference to a system having a solenoid valve, by way of example.

In the following, the functioning of the aforementioned system having a pressure chamber and a solenoid valve is described in detail with reference to FIG. 2, which shows a time sequence chart of an injection operation.

Reference number 8 denotes the variation of the current across the solenoid valve. At time $t_1$, current is applied to the solenoid valve, and, at time $t_4$, the current supply to the solenoid valve is interrupted. Reference number 9 denotes the variation of a quick-extinction current application. The solenoid valve is de-energized between times $t_4$ and $t_5$ by the application of a negative terminal voltage.

Reference number 10 denotes the variation of a solenoid valve lift, the solenoid valve being fully open at the outset, i.e., prior to time $t_1$. Reference number 11 denotes the variation of a lift of the injection system nozzle needle, the nozzle needle being fully closed at the outset, i.e., prior to time $t_1$.

As can be seen in FIG. 2, after energization of the solenoid valve begins at time $t_1$, a time period $[t_2-t_1]$ elapses until the solenoid valve is fully closed at time $t_2$. After the solenoid valve has completely closed, a pressure builds up in the pressure chamber. At time $t_3$, the nozzle needle opening pressure is exceeded, and the system starts the injection.

The end of the injection operation is initiated by an interruption of the current supply to the solenoid valve at time $t_4$. This reopens the solenoid valve, and the pressure in the pressure chamber drops. In order to achieve a short deactivation time, i.e., quick opening of the solenoid valve and, thus, quick closing of the nozzle opening, at time $t_4$ of the interruption of the current supply to the solenoid valve a quick extinction is carried out. During the quick extinction, i.e., during time period $[t_5-t_4]$, a negative terminal voltage is applied to the solenoid valve in order to quickly deenergize it, i.e. to quickly reduce the energy stored in the solenoid valve.

A time period $[t_6-t_4]$ which the solenoid valve needs from the fully closed to the fully opened state may be longer or shorter than quick extinction period $[t_5-t_4]$, depending on the type and design of the solenoid valve and the duration of the quick extinction. Once the pressure in the system has been reduced after the opening of the solenoid valve to the point that it has dropped below a nozzle needle closing pressure, the injection operation is terminated with the closing of the nozzle needle at time $t_7$.

In the following, an exemplary embodiment of a device according to the present invention for monitoring an interval between a first injection operation and a second injection operation of a combustion cycle in a cylinder of an internal combustion engine, in which the individual injection operations are controlled by an electrical actuator element, is described with reference to FIG. 3.

Figure 3:
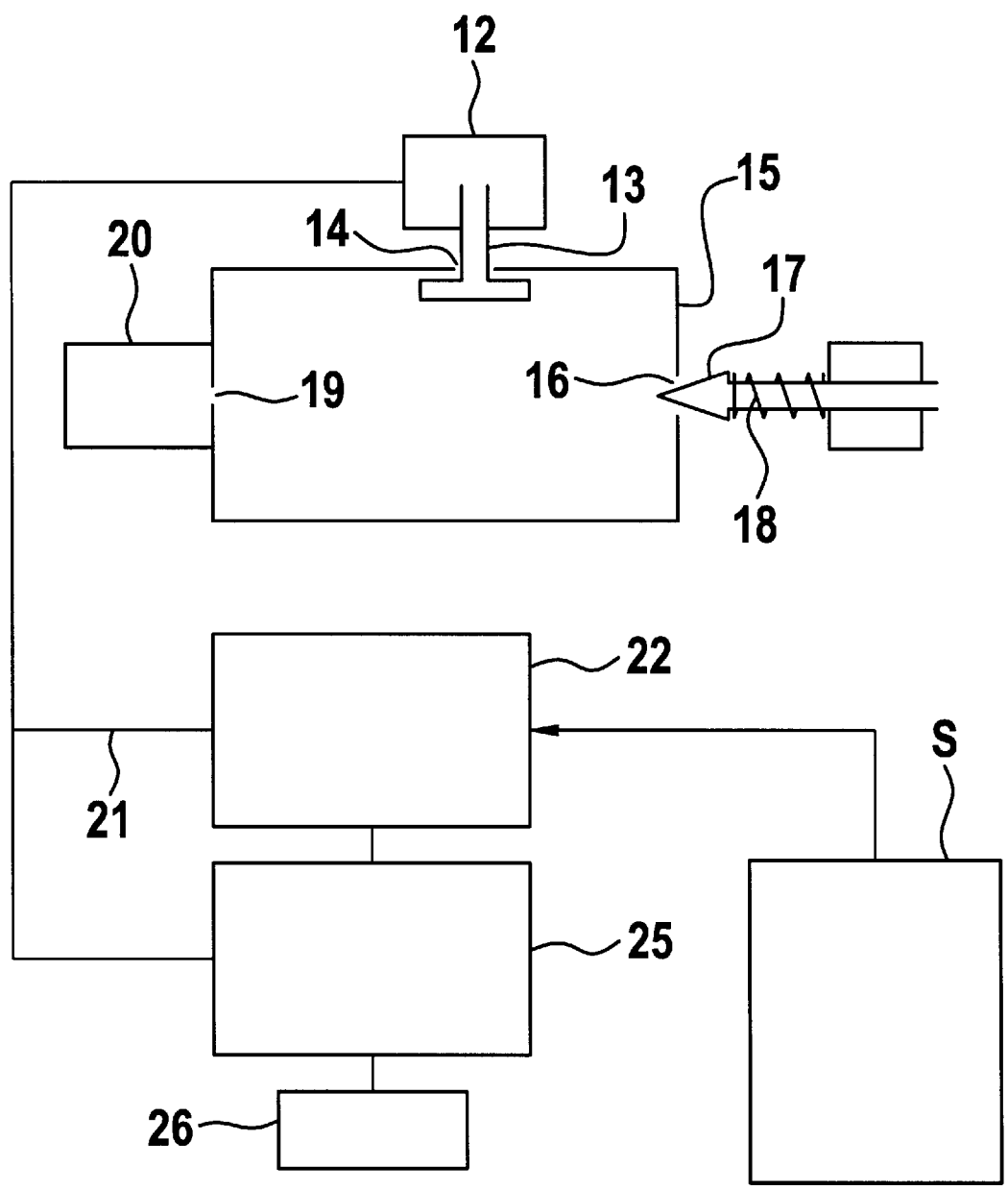
FIG. 3 shows an exemplary embodiment of the present invention having a determining device and an interval modifying device.

Reference symbol S in FIG. 3 denotes an injection controller, such as an engine control unit, which, on the basis of manipulated variables and influencing variables of the internal combustion engine, determines timing data for energizing the electrical actuator element, which is embodied here as solenoid valve 12. The manipulated variables and influencing variables include, inter alia, a setpoint torque of the engine, a rotational speed, a temperature, and a load status. The timing data includes times $t_1$, $t_4$, $t_5$, $t_8$, $t_{11}$, and $t_{12}$, as well as a desired interval $[t_9-t_2]$ which will be further elucidated with reference to FIG. 4. Injection controller S preferably determines the timing data using characteristic curves and characteristic maps.

Solenoid valve 12 includes a valve needle 13 which, in its fully closed position, closes an opening 14 in a pressure chamber 15 and, in its fully open position, leaves opening 14 in pressure chamber 15 open. Pressure chamber 15 has another opening 16, which is closed by a nozzle needle 17. Nozzle needle 17 is able to be displaced between a first fully closed position, in which it fully closes nozzle opening 16 in the pressure chamber, and a second, fully open position in which nozzle opening 16 in the pressure chamber is open. Nozzle opening 16 in pressure chamber 15 is arranged so that, with nozzle needle 17 open, fuel is injected from pressure chamber 15 into a combustion chamber in a cylinder (not shown). Nozzle needle 17 is pre-loaded in the first fully closed position using a spring 18.

Pressure chamber 15 has another opening 19 which connects pressure chamber 15 to a device 20 for building up fuel pressure in pressure chamber 15. In the present embodiment, device 20 for building up fuel pressure in pressure chamber 15 is a pump.

Solenoid valve 12 is connected via a power supply line 21 to a determining device 22 for determining whether valve needle 13 has fully opened after a first injection operation and whether energizing sequences of solenoid valve 12 overlap. Characteristic maps, from which times $t_2$ and $t_6$ of full opening and closing of valve needle 13 on the basis of at least one status parameter of the internal combustion engine are read, are stored in determining device 22. This determination may also be carried out in a controller or implemented via software in the controller.

Power supply line 21 of solenoid valve 12 is connected to an interval modifying device 25, which in turn is connected to determining device 22. Interval modifying device 25 modifies the interval between the first injection operation and a second injection operation of a combustion cycle in a cylinder when determining device 22 has determined that, after the injection operation, valve needle 13 of solenoid valve 12 has not fully opened or the energizing sequences of solenoid valve 12 overlap. Interval modifying device 25 modifies the interval between the first injection operation and the second injection operation by controlling an electrical connection between electrical power supply line 21 and a power supply 26. Interval modifying device 25 may also be implemented via software in a controller.

In the following, the functioning of the device shown in FIG. 3 is described. In a first step, determining device 22 determines whether valve needle 13 of solenoid valve 12 has fully opened after the first injection operation. Furthermore, determining device 22 determines whether energizing sequences of solenoid valve 12 overlap. If determining device 22 has determined that solenoid valve 13 has not completely opened after the first injection operation, or if determining device 22 has determined that the energizing sequences of solenoid valve 12 overlap, interval modifying device 25 modifies the interval between the first injection operation and the second injection operation in that it closes a circuit between solenoid valve 12 and power supply 26 such that a spacing between two consecutive energizing sequences of solenoid valve 12 is modified appropriately. In other words, the energizing parameters of solenoid valve 12 are modified.

In summary, the device according to the present invention monitors the following boundary conditions:
 a) separation of the two injection operations from one another, and
 b) separation of an energizing sequence for the first injection operation from an energizing sequence for the second injection operation.

According to boundary condition a), valve needle 13 must have been in the fully open position prior to the second injection operation for a stable deterministic injection behavior after the first injection operation. This type of injection is also known as absolute injection.

According to boundary condition b), energization of the solenoid valve for the second injection operation should not begin before the quick extinction of the first injection operation is terminated. If this boundary condition is not observed, extinction of the energizing sequences may occur, which results in uncontrolled injection operations with uncontrolled amounts of fuel being injected.

Figure 4:
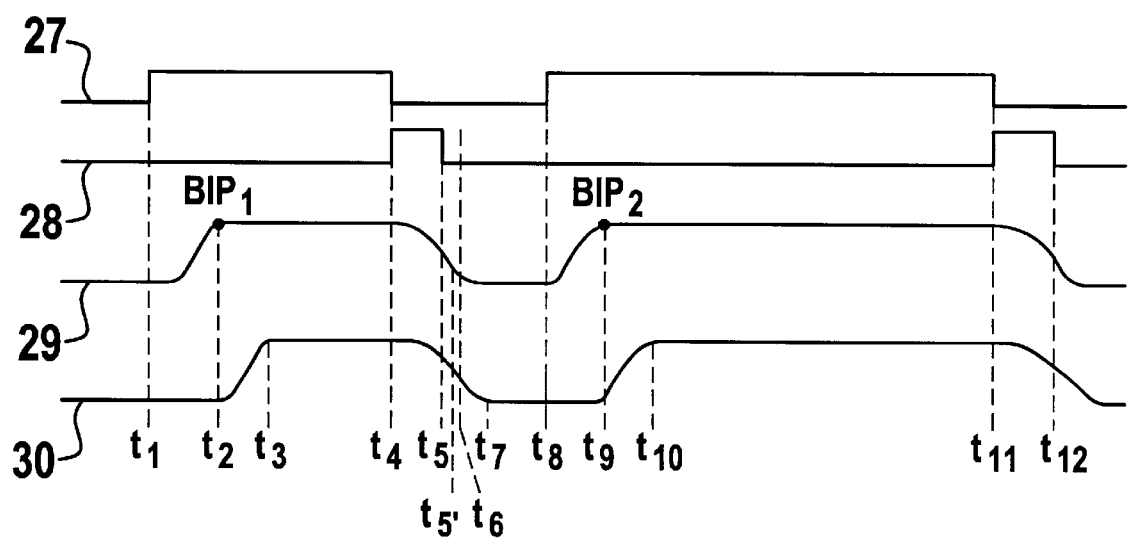
FIG. 4 shows a time sequence chart of two consecutive injection operations.

This is further described below with reference to FIG. 4. FIG. 4 shows a time sequence chart of two consecutive injections, with reference to which the functioning of the device shown in FIG. 3, in which the two aforementioned boundary conditions are observed, is further elucidated.

Reference number 27 denotes the variation of the current applied to solenoid valve 12, and reference number 28 denotes the variation of the quick extinction over time. Current variation 27 and the current variation of quick extinction 28 show energizing sequences of solenoid valve 12. The energizing sequence is the supply of power to the solenoid valve, a distinction being made between an energizing sequence for the first injection operation ($t_1$ to $t_5$) and an energizing sequence for the second injection operation (starting from $t_6$). Both current variations 27 and 28 show that no current is applied to solenoid valve 12 before time $t_1$.

Reference number 29 denotes the lift of valve needle 13 of solenoid valve 12, valve needle 13 being in the fully open position at time $t_1$, i.e. opening 14 in pressure chamber 15 is not closed and in the fully closed position at time $t_2$, i.e. opening 14 in pressure chamber 15 is closed. Time $t_2$ of the beginning of the first injection operation is labeled $BIP_1$ as in FIG. 1, and time $t_9$ of the beginning of the second injection operation is labeled $BIP_2$.

Reference number 30 denotes the variation of the nozzle needle lift of nozzle needle 17, the nozzle needle being in the fully closed position at time $t_1$, i.e. opening 16 in pressure chamber 15 is closed, so that no injection is taking place, and nozzle needle 17 is in the fully open position at time $t_3$, so that fuel injection into the cylinder is taking place through opening 16 in pressure chamber 15.

It can be seen in FIG. 4 that after the beginning of the energization of solenoid valve 12 at time $t_1$ a period $[t_2-t_1]$ elapses until valve needle 13 of the solenoid valve is in the fully closed position. When opening 14 in pressure chamber 15 is closed, pump 20 builds up a pressure in pressure chamber 15. When, after an additional delay $[t_3-t_2]$, the nozzle opening pressure is exceeded, i.e., in the exemplary embodiment shown in FIG. 3, the pressure in pressure chamber 15 is so high that nozzle needle 17 is displaced into the open position against the pre-load force of spring 18, injection of fuel through opening 16 into the cylinder begins at time $t_3$. The end of the injection operation is initiated by discontinuing the energization of solenoid valve 12 at time $t_4$. This causes valve needle 13 of solenoid valve 12 to be reset into its original position, i.e. its fully open position. Since the pressure in pressure chamber 15 is now able to escape through opening 14, after the pressure has dropped below the nozzle needle closing pressure (which is determined by spring 18), nozzle needle 17 is moved by the pre-load force of spring 18 into its closed position, so that nozzle needle 17 fully closes opening 16 at time $t_7$.

Determining device 22 determines deactivation period $[t_6-t_4]$ from the end of the energization (end of the energizing sequence of the second injection operation) of solenoid valve 12 at time $t_4$ to time $t_6$ when valve needle 13 of solenoid valve 12 is again in the fully open position by reading times $t_4$ and $t_6$ from a characteristic map.

In order to achieve a short deactivation period $[t_6-t_4]$ of solenoid valve 12, i.e. a quick opening of valve needle 13 of solenoid valve 12 and, thus, a quick closing of nozzle opening 16, a quick extinction 28 is carried out at the end of the energization of solenoid valve 12. During quick extinction, i.e. during time period $[t_5-t_4]$, a negative terminal voltage is applied to solenoid valve 12. Quick extinction is used to quickly reduce the energy stored in the solenoid valve. Times $t_4$ and $t_5$ are stipulated by injection controller S. A safety factor, which depends on the maximum instantaneous acceleration of the internal combustion engine, is preferably applied to the quick extinction period. The end of the quick extinction period corrected with the safety factor is labeled $t_5'$. Application of a negative terminal voltage to solenoid valve 12 during the entire quick extinction corrected with the safety factor is optional.

At time $t_8$, which is also stipulated by injection controller S, energization of solenoid valve 12 is initiated for the second injection operation. At time $t_9$, valve needle 13 of the solenoid valve is in the fully closed position. This time is referred to as $BIP_2$ for the second injection operation and it is determined using determining device 22, which reads times $t_9$ and $t_{12}$ from a characteristic map on the basis of at least one internal combustion engine status variable. At time $t_{10}$, injection for the second injection operation begins.

In the following, we shall describe, with reference to FIG. 5, which shows a first exemplary embodiment of determining device 22 and interval modifying device 25, how desired interval $[t_9-t_2]$ provided by injection controller S to solenoid valve 12 is monitored according to the aforementioned boundary conditions a) and b). At time $t_{11}$, energization of solenoid valve 12 is terminated.

Figure 5:
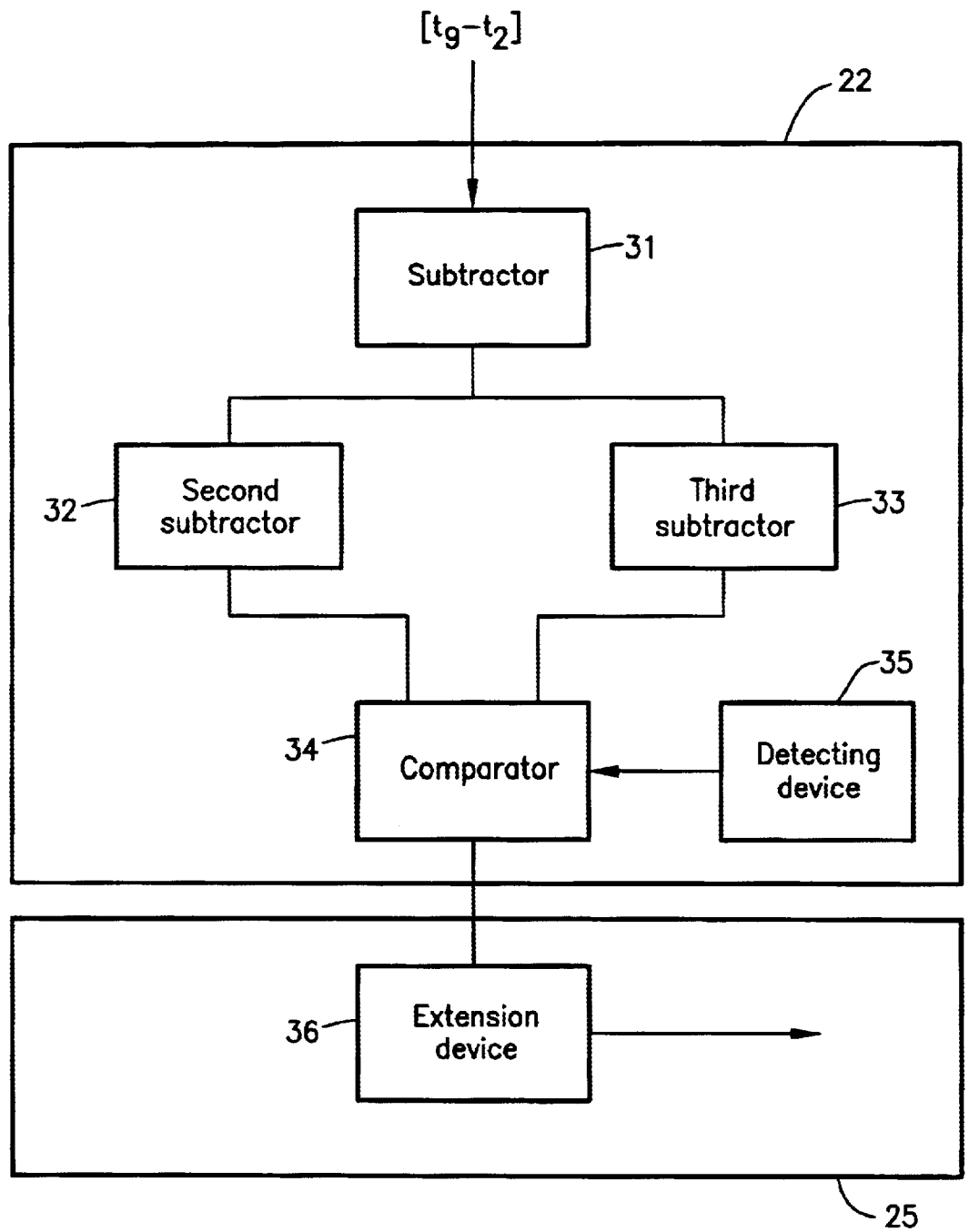
FIG. 5 shows a first exemplary embodiment of the determining device and the interval modifying device of FIG. 3.

In FIG. 5, reference number 31 denotes a first subtractor for determining a time period $[t_9-t_4]$ by subtracting a delivery period $[t_4-t_2]$ from desired interval $[t_9-t_2]$. Delivery period $[t_4-t_2]$ from time $t_2$, when valve needle 13 is in the fully closed position, to time $t_4$ at the end of the energizing sequence of solenoid valve 12, is read by determining device 22 from a characteristic map on the basis of at least one internal combustion engine status variable.

First subtractor 31 outputs the subtraction result, i.e. time period $[t_9-t_4]$, to a second subtractor 32 and to a third subtractor 33. Second subtractor 32 determines delivery pause $[t_9-t_6]$ by subtracting deactivation period $[t_6-t_4]$ of the solenoid valve from time period $[t_8-t_4]$ supplied by first subtractor 31. Third subtractor 33 determines a time period $[t_9-t_5']$ by subtracting a quick extinction period $[t_5'-t_4]$ corrected with a dynamic factor from time period $[t_9-t_4]$ supplied by first subtractor 31.

Quick extinction period $[t_5'-t_4]$, corrected with the dynamic factor, is computed by a computing device (not shown here) by computing quick extinction period $[t_5-t_4]$ prior to the beginning of first injection operation $BIP_1$ and multiplying quick extinction period $[t_5-t_4]$ by a dynamic factor which is determined on the basis of an increase in the rotational speed due to the injection. The computing device for computing time period $[t_5'-t_4]$ is preferably arranged in injection controller S.

Second subtractor 32 and third subtractor 33 each output their respective subtraction results to a comparator 34.

Determining device 22 also has a detection device 35 for detecting a closing time $[t_9-t_8]$ of valve needle 13 of solenoid valve 12. Detection device 35 detects closing time $[t_9-t_8]$, i.e., the time period that elapses after the beginning of energization of the solenoid valve (here $t_9$) until valve needle 13 fully closes opening 14 (here $t_9$). Detecting device 35 may also be implemented via software in a controller which has a microprocessor. Detecting device 35 outputs this closing time $[t_9-t_8]$ to comparator 34.

Comparator 34 compares closing time $[t_9-t_8]$ with time period $[t_9-t_5']$ supplied by third subtractor 33 from a computed end of the quick extinction of the first injection operation to the beginning of the second injection operation and with delivery pause $[t_9-t_6]$ supplied by second subtractor 32.

According to the result of the comparison, comparator 34 outputs a signal to an extension device 36 which is arranged in interval modifying device 25. Extension device 36 extends desired interval $[t_9-t_2]$ on the basis of the output signal of comparator 34, so that it extends interval $[t_9-t_2]$ by the duration of closing time $[t_9-t_8]$ minus delivery pause $[t_9-t_6]$ if the closing time is greater than or equal to time period $[t_9-t_5']$ or delivery pause $[t_9-t_6]$. Extension device 36 extends desired interval $[t_9-t_2]$ by switching the circuit between solenoid valve 12 and power supply 26 according to the extended interval. Thus the first injection is shifted forward.

Figure 6:
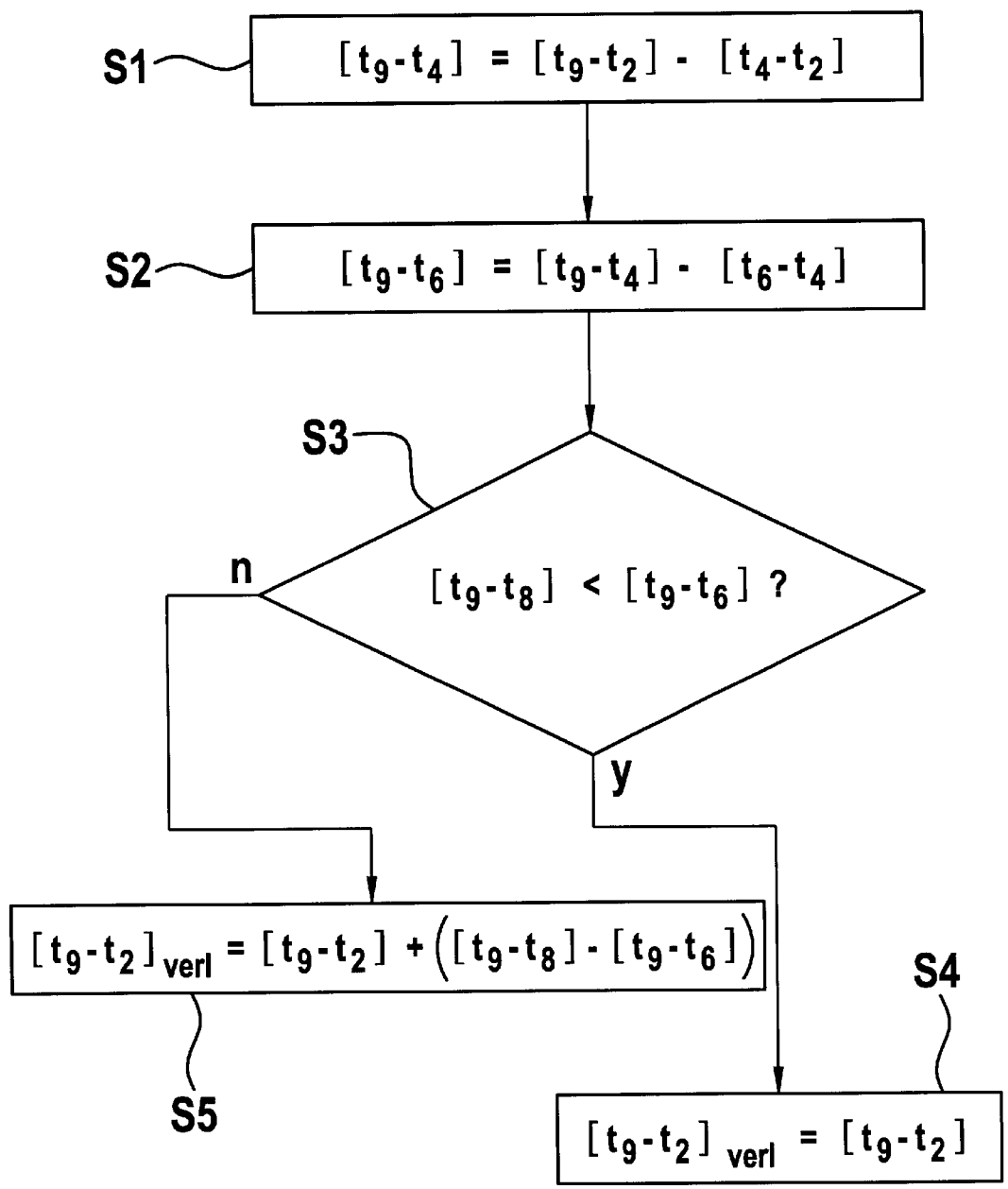
FIGS. 6 and 7 show flow charts which illustrate a first embodiment of the functioning of the devices illustrated in FIG. 5.
Figure 7:
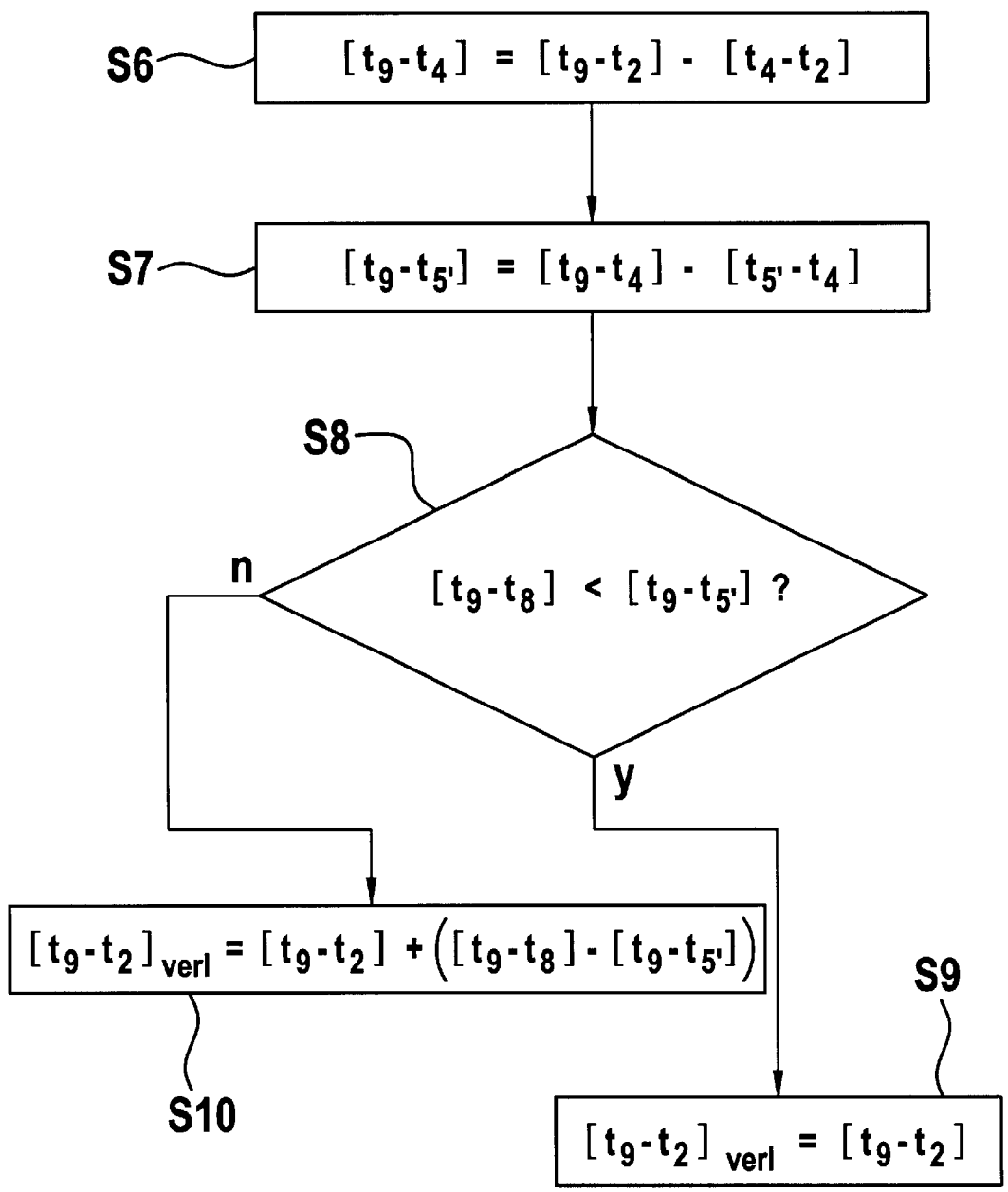

An exemplary embodiment of the functioning of the devices shown in FIG. 5 is now described with reference to FIGS. 6 and 7. FIG. 6 shows the functioning of the device of FIG. 5 regarding the monitoring of boundary condition a).

In step S1, a time period $[t_9-t_4]$ is determined by subtracting delivery period $[t_4-t_2]$ from desired interval $[t_9-t_2]$. Then in step S2, the duration of delivery pause $[t_{90}-t_6]$ between the first injection operation and the second injection operation during which no injection into the cylinder takes place is computed via time period $[t_9-t_4]$. Delivery pause $[t_9-t_6]$ is determined by subtracting deactivation period $[t_6-t_4]$ from time period $[t_9-t_4]$.

In the following step S3, closing time $[t_9-t_8]$ of valve needle 13 of solenoid valve 12 is compared with delivery pause $[t_9-t_6]$ determined in step S2. When closing time $[t_9-t_8]$ is shorter than delivery pause $[t_9-t_6]$, delivery pause $[t_9-t_6]$ is sufficiently long to ensure full opening of valve needle 13 of solenoid valve 12 between the first injection operation and the second injection operation. In this case, interval modifying device 25 does not modify desired interval $[t_9-t_2]$ in step S4. This is shown in FIG. 6 with $[t_9-t_2]_{ver1}=[t_9-t_2]$.

However, if it is determined in step S3 that closing time $[t_9-t_8]$ is greater than or equal to delivery pause $[t_9-t_6]$, desired interval $[t_9-t_2]$ is extended in step S5 by the duration of closing time $[t_9-t_8]$ minus delivery pause $[t_9-t_6]$. This is shown in FIG. 6 with $[t_9-t_2]_{ver1}=[t_9-t_2]+([t_9-t_8]-[t_9-t_6])$. Then, by extending desired interval $[t_9-t_2]$ using extension device 36, it is possible to ensure that valve needle 13 of the solenoid valve is moved to the fully open state between the two injection operations.

Next, the functioning of the devices shown in FIG. 5 regarding monitoring of boundary condition b) will be described with reference to FIG. 7. Step S6 in FIG. 7 corresponds to step S1 in FIG. 6, so that for a detailed description of step S6 reference may be made here to step S1 of FIG. 6.

In step S7, quick extinction period $[t_5'-t_4]$ corrected with the dynamic factor is subtracted from the subtraction result of step S6. This yields a time period $[t_9-t_5]$, which is compared with closing time $[t_9-t_8]$ in step S8. When closing time $[t_9-t_8]$ is less than time period $[t_9-t_5^1]$, processing continues with step S9. Step S9 corresponds to step S4 of FIG. 6, so that for a detailed description of step S9 reference is made here to step S4 of FIG. 6.

If the comparison in step S8 shows that closing time $[t_9-t_8]$ is greater than or equal to time period $[t_9-t_5']$, desired interval $[t_9-t_2]$ is extended in step S10 by the duration of closing time $[t_9-t_8]$ minus time period $[t_9-t_5']$. This is indicated in FIG. 7 with $[t_9-t_2]_{ver1}=[t_9-t_2]+([t_9-t_8]-[t_9-t_5'])$.

Using the above-described method and the aforementioned device, it is ensured, in a simple and cost-effective manner, that no injection overlap occurs between two injection operations of a combustion cycle in a cylinder and no overlapping occurs between energizing sequences of the solenoid valve.

Figure 8:
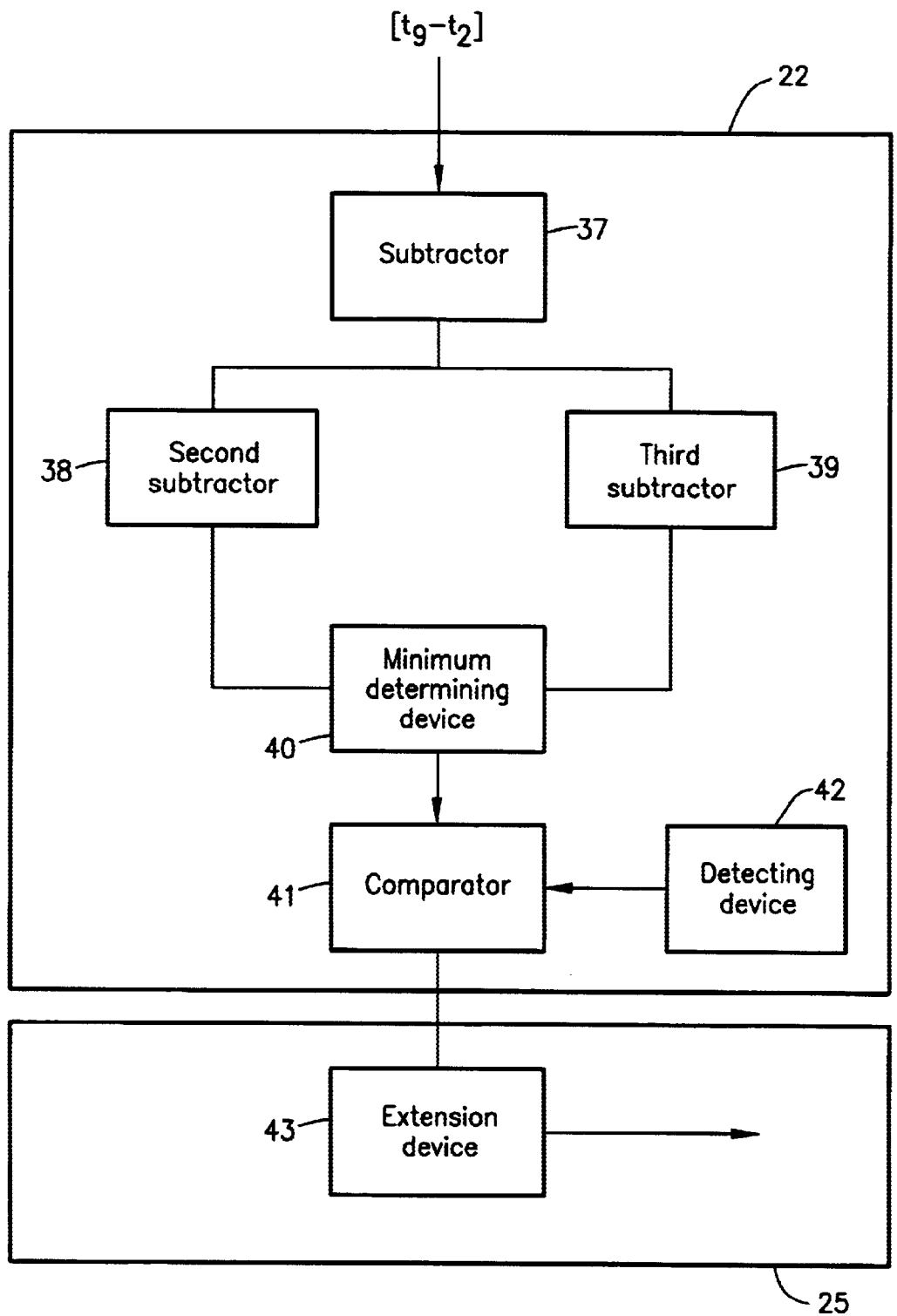
FIG. 8 shows a second exemplary embodiment of the determining device and the interval modifying device of FIG. 3.

FIG. 8 shows a second exemplary embodiment of determining device 22 and interval modifying device 25 of FIG. 3.

Reference number 37 denotes a first subtractor which subtracts delivery period $[t_4-t_2]$ from desired interval $[t_9-t_2]$. The subtraction result is output to a second subtractor 38 and to a third subtractor 39.

Second subtractor 38 determines delivery pause $[t_9-t_6]$ by subtracting deactivation period $[t_6-t_4]$ of the solenoid valve from the time period determined in first subtractor 37. Delivery pause $[t_9-t_6]$ determined in second subtractor 38 is output to a minimum determining device 40.

In third subtractor 39, quick extinction period $[t_5'=t_4]$ corrected with the dynamic factor is subtracted from the time period supplied by first subtractor 37. Quick extinction period $[t_5'-t_4]$ corrected with the dynamic factor is computed in the same way as in the exemplary embodiment described with reference to FIG. 5. The subtraction result of third subtractor 39 is output to minimum determining device 40.

Minimum determining device 40 determines the shorter of the two time periods that have been input, namely of time period $[t_9-t_5']$ from the end of the quick extinction of the first injection operation to the beginning of the second injection operation, and delivery pause $[t_{90}-t_6]$.

The shorter time period determined in minimum determining device 40 is output to a comparator 41. Comparator 41 compares a closing time $[t_9-t_8]$ which has been detected by a detection device 42, which corresponds to detection device 35 in FIG. 5, with the time period output by minimum determining device 40. The comparison result is output to an extension device 43 arranged in interval modifying device 25, which modifies desired interval $[t_9-t_2]$ on the basis of this result.

Figure 9:
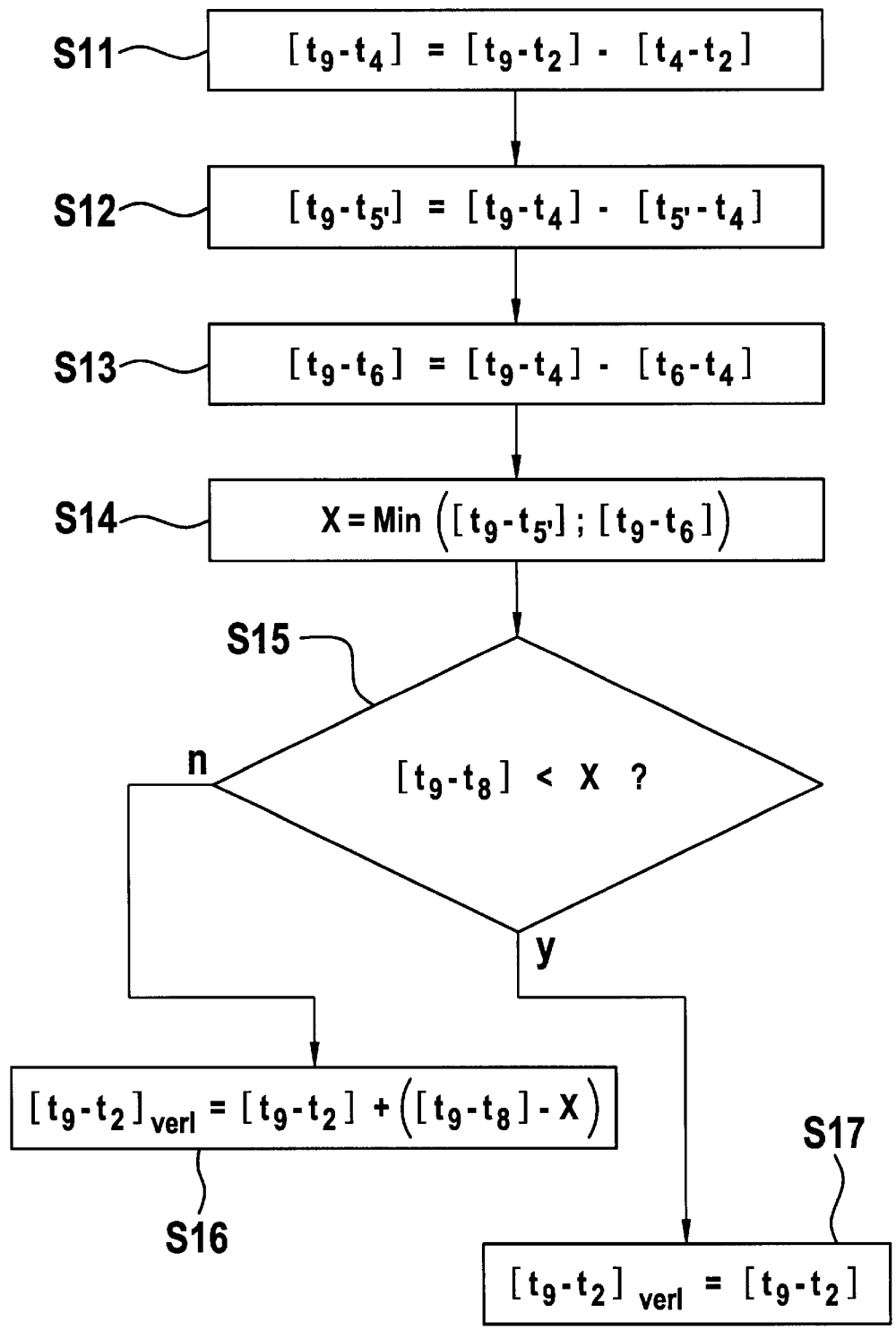
FIG. 9 shows a flow chart which illustrates an exemplary embodiment of the functioning of the devices illustrated in FIG. 8.

An exemplary embodiment of the functioning of the exemplary embodiment shown in FIG. 8 is now described with reference to the flow chart of FIG. 9.

In step S11, a time period $[t_9-t_4]$ is computed by subtracting delivery period $[t_4-t_2]$ from desired interval $[t_9-t_2]$.

In step S12, quick extinction period $[t_5'-t_4]$ corrected with the dynamic factor, which has been determined as described with reference to FIG. 5, is subtracted from the time period determined in step S11.

In step S13, delivery pause $[t_9-t_6]$ is determined by subtracting deactivation period $[t_6-t_4]$ from time period $[t_9-t_4]$ determined in step S11. In step S14, it is determined which of the two following time periods, namely time period $[t_9-t_5']$ determined in step S12 or delivery period $[t_9-t_6]$ is the shorter time period. The shorter time period determined in step S14, which is labeled with X in FIG. 9, is then compared with closing time $[t_9-t_8]$ in step S15. If closing time $[t_9-t_8]$ is greater than shorter time period X determined in step S14, desired interval $[t_9-t_2]$ is extended in step S16 by the duration of closing time $[t_9-t_8]$ minus time period X determined in step S14. This is shown in FIG. 9 with $[t_9-t_2]_{ver1}=[t_9-t_2]+([t_9-t_8]-X)$.

If it is determined in step S15 that closing time $[t_9-t_8]$ is less than or equal to the time period determined in step S14, desired interval $[t_9-t_2]$ is not modified in step S17, in the same way as in step S4 in FIG. 6.

Figure 10:
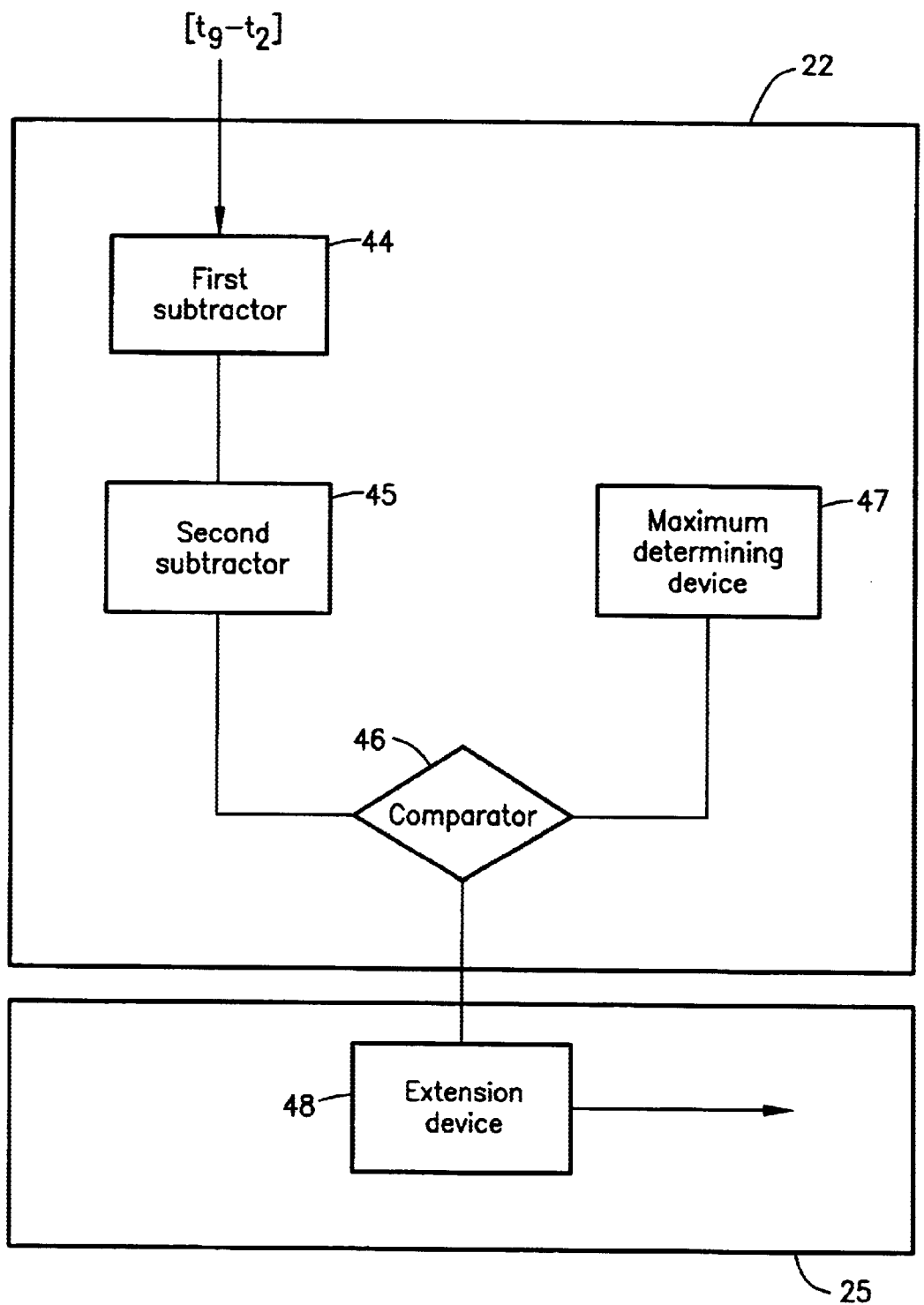
FIG. 10 shows a second exemplary embodiment of the determining device and the interval modifying device of FIG. 3.

FIG. 10 shows a third exemplary embodiment of determining device 22 and interval modifying device 25 of FIG. 3.

Reference number 44 denotes a first subtractor 44 which determines time period $[t_9-t_4]$ by subtracting delivery period $[t_4-t_2]$ from desired interval $[t_9-t_2]$. First subtractor 44 outputs the subtraction result to a second subtractor 45.

Second subtractor 45 subtracts closing time $[t_9-t_8]$ of valve needle 13 of solenoid valve 12 from the output of first subtractor 44. The subtraction result of second subtractor 45 is output to a comparator 46.

Reference number 47 denotes a maximum determining device. Maximum determining device 47 determines which of the two following time periods is longer: deactivation period $[t_6-t_4]$ of solenoid valve 12 or quick extinction period $[t_5'-t_4]$ corrected with a dynamic factor. Deactivation period $[t_6-t_4]$ and quick extinction period $[t_5'-t_4]$ corrected with the dynamic factor are determined as described in the preceding exemplary embodiments. Therefore reference is made to the detailed description of the previous exemplary embodiments.

The determination result obtained by maximum determining device 47 is output to comparator 46.

Comparator 46 compares the two input variables, namely time period $[t_8-t_4]$ between two energizing operations of solenoid valve 12 with the determined longer time period of deactivation period $[t_6-t_4]$ and quick extinction period $[t_5'-t_4]$ corrected with a dynamic factor.

The comparison result is then output to an extension device 48 which is arranged in interval modifying device 25 and extends desired interval $[t_9-t_2]$ on the basis of this comparison. Extension device 48 essentially corresponds to extension device 36 in FIG. 5 and extension device 43 in FIG. 8.

Therefore reference is made to the description of these figures for the detailed description of extension device 48.

Figure 11:
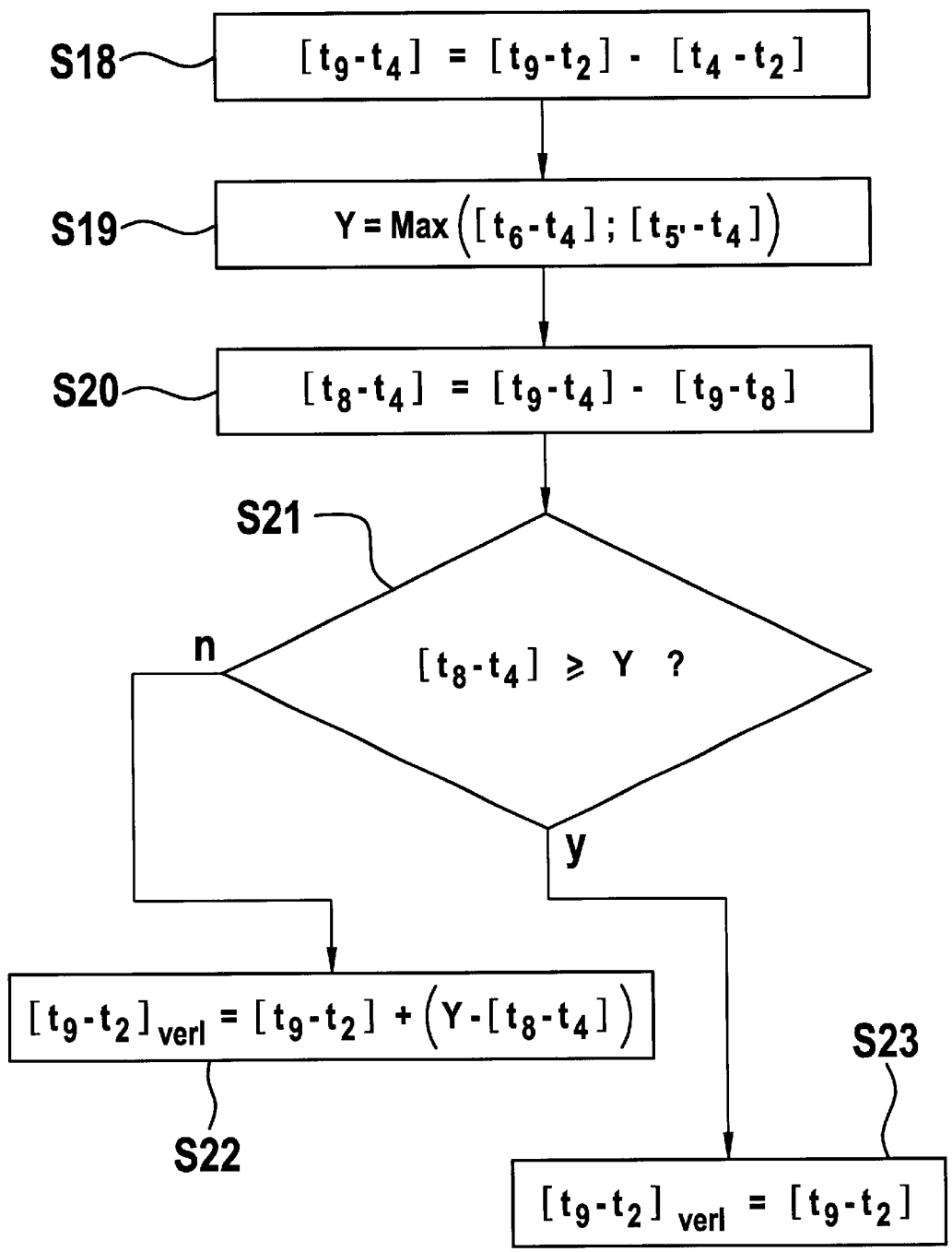
FIG. 11 shows a flow chart which illustrates an exemplary embodiment of the functioning of the devices illustrated in FIG. 10.

In the following, an exemplary embodiment of the functioning of the exemplary embodiment shown in FIG. 10 will be described with reference to the flow chart of FIG. 11.

In step S18, a time period $[t_9-t_4]$ is computed by subtracting delivery period $[t_4-t_2]$ from desired interval $[t_9-t_2]$. Then the processing continues at step S19.

In step S19, it is determined which of the following two time periods is the longer: deactivation period $[t_6-t_4]$ or quick extinction period $[t_5'-t_4]$ corrected with the dynamic factor and which has been determined as described with reference to FIG. 5. The determined longer period is labeled with Y in FIG. 11.

In step S20, closing time $[t_9-t_8]$ is subtracted from time period $[t_9-t_4]$ determined in step S18. In step S21, longer time period Y determined in step S19 is compared with time period $[t_8-t_4]$ determined in step S20.

If in step S21 it is determined that time period $[t_8-t_4]$ determined in step S20 is greater than or equal to longer time period Y, determined in step S19, of deactivation period $[t_6-t_4]$ and quick extinction period $[t_5'-t_4]$ corrected with the dynamic factor, desired interval $[t_9-t_2]$ is not modified in step S22.

If in step S21 it is determined that the longer time period determined in step S19 is greater than time period $[t_8-t_4]$ determined in step S20, desired interval $[t_9-t_2]$ is extended in step S23 by time period Y minus time period $[t_8-t_4]$. This is shown in FIG. 11 with $[t_9-t_2]_{ver1}=[t_9-t_2]+(Y-[t_8-t_4])$.

Instead of maximum determining device 47, comparator 46 may also be equipped to compare $[t_6-t_4]$ and $[t_5'-t_4]$ with $[t_8-t_4]$. Then the processing continues from step S21 to step S22 if $[t_8-t_4]$ is less than both $[t_6-t_4]$ and $[t_5'-t_4]$; otherwise it goes to step S23.

Furthermore, the variables used in the exemplary embodiment of FIG. 10 are determined in the same manner as in the previously described exemplary embodiments.

The present invention thus advantageously makes it possible to monitor desired interval $[t_9-t_2]$ without having to detect the actual position of nozzle needle 17. This is particularly advantageous because detection of the movement and position of the nozzle needle is very complicated due to its inaccessible position in the cylinder head of an internal combustion engine.

In the above-described exemplary embodiments, only time periods were used for illustration purposes. However, depending on the type of measurement of the time periods, the respective variables may also be specified as crank angle units ° KW.

All devices of determining device 22 and interval modifying device 25 are preferably implemented by a microprocessor device or a programmable logic device such as an EPLD.

What is claimed is:

1. A method of monitoring an interval ($[t_9-t_2]$) between a first injection operation and a second injection operation of a combustion cycle in a cylinder of an internal combustion engine in which the individual injection operations are controlled by an electrical actuator element, comprising the following steps:

determining whether the actuator element (12, 13) has fully opened after the first injection operation;

determining whether the energizing sequences (27, 28) of the electrical actuator element (12, 13) for the first injection operation and for the second injection operation overlap; and modifying the interval ($[t_9-t_2]$) if the electrical actuator element (12, 13) has not fully opened after the first injection operation or if the energizing sequences (27, 28) of the electrical actuator element (12, 13) overlap.

2. The method according to claim 1, characterized by the following steps:

determining (S3, S8) whether the electrical actuator element (12, 13) has fully opened after the first injection operation and whether the energizing sequences (27, 28) of the electrical actuator element (12, 13) overlap by comparing a closing time ($[t_9-t_8]$) of the electrical actuator element (12, 13) with a first time period ($[t_9-t_5']$) from a computed end of a quick extinction of the first injection operation to the beginning of the second injection operation and a delivery pause ($[t_9-t_6]$); and extending (S4, S5, S9, S10) the interval ($[t_9-t_2]$) on the basis of the comparison of the closing time ($[t_9-t_8]$) of the electrical actuator element (12, 13) with the first time period ($[t_9-t_5']$) and the delivery pause ($[t_9-t_6]$).

3. The method according to claim 1, characterized by the following steps:

determining (S14) a shorter time period of the first time period ($[t_9-t_5']$) from a computed end of a quick extinction of the first injection operation to the beginning of the second injection operation and the delivery pause ($[t_9-t_6]$);

determining (S15) whether the electrical actuator element (12, 13) has fully opened after the first injection operation and whether the energizing sequences (27, 28) of the electrical actuator element (12, 13) overlap by comparing the closing time ($[t_9-t_8]$) of the electrical actuator element (12, 13) with the determined shorter time period of the first time period ($[t_9-t_5']$) and the delivery pause ($[t_9-t_6]$); and extending (S16, S17) the interval ($[t_9-t_2]$) on the basis of this comparison.

4. The method according to claim 2, characterized by the following steps:

determining (S1, S6, S11, S18) a second time period ($[t_9-t_4]$) by subtracting a delivery period ($[t_4-t_2]$) from the interval ($[t_9-t_2]$);

determining (S2, S13) the delivery pause ($[t_9-t_6]$) by subtracting a deactivation period ($[t_6-t_4]$) of the electrical actuator element (12, 13) from the second time period ($[t_9-t_4]$);

computing a quick extinction period ($[t_5'-t_4]$) corrected with the dynamic factor by computing a quick extinction period ($[t_5-t_4]$) prior to the beginning of the first injection operation and multiplying the quick extinction period ($[t_5-t_4]$) by a dynamic factor which is determined on the basis of an increase in the rotational speed due to the injection;

determining (S7, S12) the first time period ($[t_9-t_5']$) by subtracting the quick extinction period ($[t_5'-t_4]$) corrected with the dynamic factor from the second time period ($[t_9-t_4]$).

5. The method according to claim 1, characterized by the following steps:

determining whether the electrical actuator element (12, 13) has fully opened after the first injection operation and whether the energizing sequences (27, 28) of the electrical actuator element (12, 13) overlap by comparing a third time period ($[t_8-t_4]$) between two energizing operations of the electrical actuator element (12, 13) with the deactivation period ($[t_6-t_4]$) of the electrical actuator element and the quick extinction period ($[t_5'-t_4]$) corrected with the dynamic factor;

extending the interval ($[t_9-t_2]$) on the basis of this comparison.

6. The method according to claim 1, characterized by the following steps:

determining (S19) the longer time period of the deactivation period ($[t_6-t_4]$) and the quick extinction period ($[t_5'-t_4]$) corrected with the dynamic factor;

determining whether the electrical actuator element (12, 13) has fully opened after the first injection operation and whether the energizing sequences (27, 28) of the electrical actuator element (12, 13) overlap by comparing a third time period ($[t_8-t_4]$) between two energizing operations of the electrical actuating element (12, 13) with the determined longer time period of the deactivation period ($[t_6-t_4]$) and with the quick extinction period ($[t_5'-t_4]$) corrected with the dynamic factor;

extending (S22, S23) the interval ($[t_9-t_2]$) on the basis of this comparison.

7. The method according to claim 2, characterized by the following step:

extending (S22, S23) the interval ($[t_9-t_2]$) by the duration of the closing time ($[t_9-t_8]$) of the electrical actuator element (12, 13) minus the delivery pause ($[t_9-t_6]$).

8. The method according to claim 5, further including the following steps:

determining (S18) the second time period ($[t_9-t_4]$) by subtracting a delivery period ($[t_4-t_2]$) from the interval ($[t_9-t_2]$);

determining the third time period ($[t_8-t_4]$) by subtracting the closing time ($[t_9-t_8]$) of the electrical actuator element (12, 13) from the second time period ($[t_9-t_4]$);

computing the quick extinction period ($[t_5'-t_4]$) corrected with the dynamic factor by computing the quick extinction period ($[t_5-t_4]$) prior to the beginning of the first injection operation and multiplying the quick extinction period ($[t_5-t_4]$) by the dynamic factor which is determined on the basis of an increase in the rotational speed due to the injection.

9. A device for monitoring an interval ($[t_9-t_2]$) between a first injection operation and a second injection operation of a combustion cycle in a cylinder of an internal combustion engine in which the individual injection operations are controlled by an electrical actuator element (12, 13), comprising:

a determining device (22) for determining whether the electrical actuator element (12, 13) has fully opened after the first injection operation and for determining whether energizing sequences (27, 28) of the electrical actuator element (12, 13) for the first injection operation and for the second injection operation overlap; and an interval modifying device (25) for modifying the interval ($[t_9-t_2]$) if the electrical actuator element (12, 13) has not fully opened after the first injection operation or if the energizing sequences (27, 28) of the electrical actuator element (12, 13) overlap.

10. The device according to claim 9, wherein the determining device (22) has a first comparator (34) for comparing a closing time ($[t_9-t_8]$) of the electrical actuator element (12, 13) with a first time period ($[t_9-t_5']$) from a computed end of a quick extinction of the first injection operation to the beginning of the second injection operation and a delivery pause ($[t_9-t_6]$); and the interval modifying device (25) has an extension device (36) for extending the interval ($[t_9-t_2]$) on the basis of the comparison of the closing time ($[t_9-t_8]$) of the electrical actuator element (12, 13) with the first time period ($[t_9-t_5']$) and the delivery pause ($[t_9-t_6]$).

11. The device according to claim 9, wherein the determining device (22) has a minimum determining device (40) for determining a shorter time period of the first time period ($[t_9-t_5']$) from a computed end of a quick extinction of the first injection operation to the beginning of the second injection operation and the delivery pause ($[t_9-t_6]$); and a second comparator (41) for comparing the closing time ($[t_9-t_8]$) of the electrical actuator element (12, 13) with the determined shorter time period of the first time period ($[t_9-t_5']$) and the delivery pause ($[t_9-t_6]$); and the interval modifying device (25) has an extension device (43) for extending the interval ($[t_9-t_2]$) on the basis of this comparison.

12. The device according to claim 9, characterized by a first subtractor (31, 37) for determining a second time period ($[t_9-t_4]$) by subtracting a delivery period ($[t_4-t_2]$) from the interval ($[t_9-t_2]$);

a second subtractor (32, 38) for determining the delivery pause ($[t_9-t_6]$) by subtracting a deactivation period ($[t_6-t_4]$) of the electrical actuator element (12, 13) from the second time period ($[t_9-t_4]$);

a computing device for computing a quick extinction period ($[t_5'-t_4]$) corrected with the dynamic factor by computing a quick extinction period ($[t_5-t_4]$) prior to the beginning of the first injection operation and multiplying the quick extinction period ($[t_5-t_4]$) by a dynamic factor which is determined on the basis of an increase in the rotational speed due to an injection; and a third subtractor (33, 39) for determining the first time period ($[t_9-t_5']$) by subtracting the quick extinction period ($[t_5'-t_4]$) corrected with the dynamic factor from the second time period ($[t_9-t_4]$).

13. The device according to claim 9, wherein the determining device (22) has a third comparator for comparing a third time period ($[t_8-t_4]$) between two energizing operations of the electrical actuator element (12, 13) with the deactivation period ($[t_6-t_4]$) of the electrical actuator element (12, 13) and the quick extinction period ($[t_5'-t_4]$) corrected with the dynamic factor; and the interval modifying device (25) has an extension device (47) for extending the interval ($[t_9-t_2]$) on the basis of this comparison.

14. The device according to claim 9, wherein the determining device (22) has a maximum determining device (47) for determining the longer time period of the deactivation period ($[t_6-t_4]$) of the electrical actuator element (12, 13) and the quick extinction period ($[t_5'-t_4]$) corrected with the dynamic factor; and a comparator (46) for comparing a third time period ($[t_8-t_4]$) between two energizing operations (27, 28) of the electrical actuator element (12, 13) with the determined longer time period of the deactivation period ($[t_6-t_4]$) and the quick extinction period ($[t_5'-t_4]$) corrected with a dynamic factor; and the interval modifying device (25) has an extension device (48) for extending the interval ($[t_9-t_2]$) on the basis of this comparison.

15. The device according to claim 10, wherein the extension device (48) extends the interval ($[t_9-t_2]$) by the duration of the closing time ($[t_9-t_8]$) of the electrical actuator element (12, 13) minus the delivery pause ($[t_9-t_6]$).

16. The device according to claim 13, characterized by a first subtractor (44) for determining the second time period ($[t_9-t_4]$) by subtracting the delivery period ($[t_4-t_2]$) from the interval ($[t_9-t_2]$);

a second subtractor (45) for determining the third time period ($[t_8-t_4]$) by subtracting the closing time ($[t_9-t_8]$) of the electrical actuator element (12, 13) from the second time period ($[t_9-t_4]$); and a computing device for computing the quick extinction period ($[t_5'-t_4]$) corrected with the dynamic factor by computing the quick extinction period ($[t_5-t_4]$) prior to the beginning of the first injection operation and multiplying the quick extinction period ($[t_5-t_4]$) by the dynamic factor which is determined on the basis of an increase in the rotational speed due to an injection.

* * * * *